(12) United States Patent
Keithley et al.

(10) Patent No.: US 7,480,066 B2
(45) Date of Patent: Jan. 20, 2009

(54) MODULATED VIDEO WAVEFORM GENERATOR

(75) Inventors: Douglas Gene Keithley, Boise, ID (US); Mark David Montierth, Meridian, ID (US); Richard David Taylor, Eagle, ID (US)

(73) Assignee: Marvell International Technology Ltd., Hamilton (BM)

( * ) Notice: Subject to any disclaimer, the term of this patent is extended or adjusted under 35 U.S.C. 154(b) by 932 days.

(21) Appl. No.: 10/903,560

(22) Filed: Jul. 29, 2004

(65) Prior Publication Data

US 2006/0023250 A1 Feb. 2, 2006

(51) Int. Cl.
*G06F 3/12* (2006.01)
(52) U.S. Cl. ............... 358/1.15; 358/1.7; 358/1.16; 358/402; 307/76; 307/78; 307/84; 710/22; 345/530; 347/233; 347/247

(58) Field of Classification Search .......... 307/76, 307/78, 84; 346/108; 347/233, 247; 345/530; 358/1.15–1.17, 402
See application file for complete search history.

(56) References Cited

U.S. PATENT DOCUMENTS

| | | | | |
|---|---|---|---|---|
| 4,646,160 A | * | 2/1987 | Iizuka et al. | 358/402 |
| 5,551,152 A | * | 9/1996 | Tseng | 30/41 |
| 6,493,019 B1 | * | 12/2002 | Hirasawa | 347/233 |

* cited by examiner

*Primary Examiner*—Houshang Safaipour
*Assistant Examiner*—Dennis Dicker

(57) ABSTRACT

A video controller includes a video block that connects to the print control engine and one laser driver. The video block includes a direct memory access (DMA) block, a video processor, a waveform generator including pattern and multiple pulse mode modulation, a frequency synthesizer, configuration registers, and a data bus. The frequency synthesizer connects to the waveform generator. The configuration registers connect to the DMA block, video processor and the waveform generator. The data bus, operative to carry bus control signals, connects the DMA block, video processor, waveform generator, and the configuration registers.

23 Claims, 3 Drawing Sheets

MODULATED VIDEO WAVEFORM GENERATOR

BACKGROUND

In a laser printer, printing is achieved by first scanning a digitized image onto a photoconductor. Typically, the scanning is performed with diodes, e.g. laser diodes or light emitting diodes that pulse a beam of energy onto the photoconductor. The photoconductor typically comprises a movable surface coated with a photoconductive material capable of retaining localized electrical charges. The surface of the photoconductor is conceptually divided into small units called pixels. Each pixel area is capable of being charged to a given electrical potential, but it is not completely independent of the electrical charge of each surrounding pixel due to charge sharing and the manner in which toner is attracted to the charged areas. The charge sharing effects can be utilized to create effectively larger or smaller pixels, to control the thickness of the attracted toner layer, and to reposition individual pixels horizontally or vertically by a fraction of a pixel. This is typically accomplished by using pulse-width-modulated waveforms.

The digitized image is essentially organized into a two dimensional matrix within a raster. The image is digitized into a number of lines. Each line comprises a number of discrete points. Each of the points corresponds to a pixel on the photoconductor. Each point is assigned a binary value relating information pertaining to its color and potentially other attributes, such as density. The matrix of points makes up the resultant digitally stored image. The digital image is stored in computer readable memory as a raster image. Video blocks or scan control circuitry read the raster image data and actuates the laser to selectively expose a given pixel based on the presence or absence of coloration, and the degree of coloration for the pixel. For a four-color laser printer, at least one laser scanner is included in the printer and used to generate a latent electrostatic image on the photoconductor. Generally, one latent electrostatic image is generated for each color plane, e.g. cyan, yellow, magenta, and black, to be printed.

One prior art method to provide pixel position control is use an external pulse width modulator. The horizontal justification of the pixel is limited to right, left, or center. In addition, there is increased complexity in handling horizontal synchronization.

Another prior art technique is to use a fixed tap pulse width modulator with a fixed multiple oversampling clock for pixel control. The typical pulse width modulator typically has a single pulse with justification and does not permit arbitrary waveforms. This technique further limits how the oversampling clock may be generated.

Alternatively, a feedback loop delay tap pulse width modulator can be used. The delay elements require custom layout. The design requires real-time calibration to adjust for process, voltage, temperature (PVT) and PVT drift. Delay elements require complicated production testing procedures, and delay elements are not portable. A dithered input reference cannot be used and the output frequency spectrum cannot be easily smeared to reduce radio frequency interference (RFI). Due to the complex calibration and testing features, the design is large.

SUMMARY

A video controller includes a scanning control circuit or video block connects to the print control engine and a single laser driver. The novel video block provides multiple pulse mode and pattern mode control during image rendering. The video block includes a direct memory access (DMA) block, a video processor, a modulated waveform generator including pattern and multiple pulse mode, a frequency synthesizer, configuration registers, and a data bus. The frequency synthesizer connects to the modulated waveform generator. The configuration registers connected to the DMA block, video processor and the modulated waveform generator. The data bus, operative to carry bus control signals, connects the DMA block, video processor, modulated waveform generator, and the configuration registers.

The a modulated waveform generator provides patterns and a pulse-width modulation like function using an oversampling clock input with a programmable oversample ratio, a programmable decoding table, and comparators. An arbitrary pattern (for each pixel code) is generated when the decoding table is loaded with the patterns. The pattern width is limited to the smaller of the table width or the oversample ratio. At higher oversampling rates, the pulse comparators can be used to generate pulses placed anywhere within the pixel window. The number of taps is limited by the width of the counters, comparators, and the ASIC process frequency.

DETAILED DESCRIPTION

Figure 1:
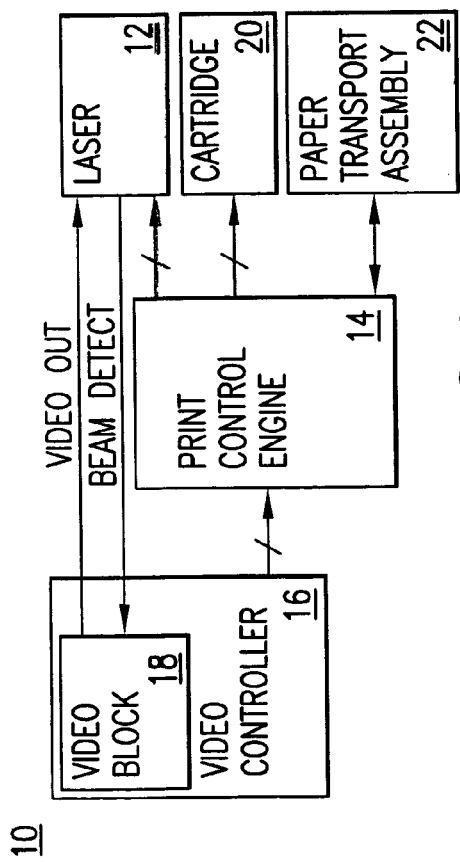
FIG. 1 discloses a printer of the present invention.

FIG. 1 discloses a functional block diagram 10 corresponding to a printer of the present invention. The printer 10 includes a single laser driver 12 and a print control engine 14. A video controller 16 that includes a scanning control circuit or video block 18 connects to the print control engine 14 and a single laser driver 12. The system 10 further includes a cartridge assembly 20 and a paper transport assembly 22 in communication with the print control engine 14.

Figure 2:
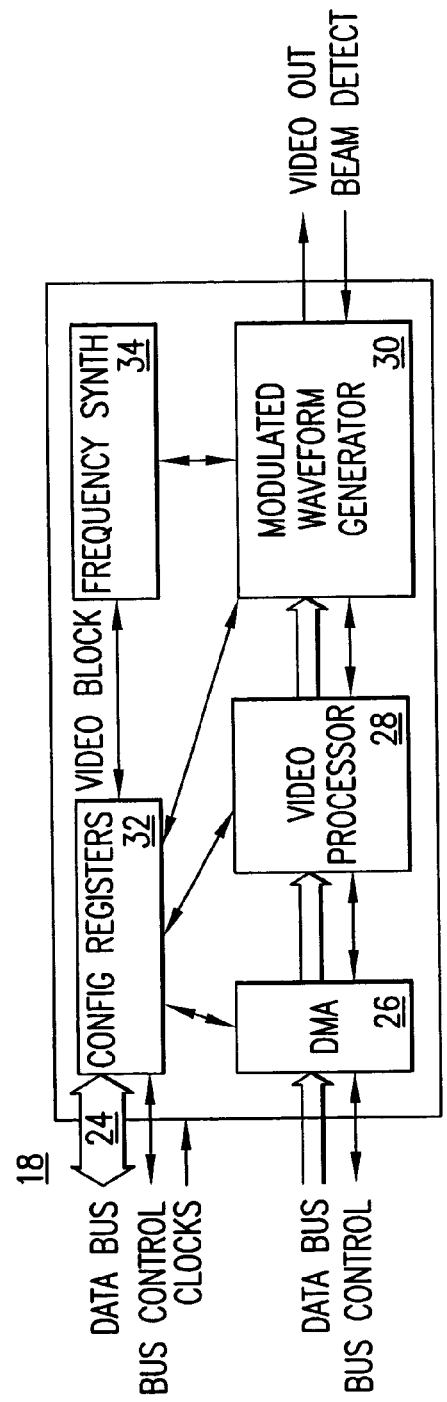
FIG. 2 discloses a scanning control circuit or video block of the present invention.

FIG. 2 discloses a scanning control circuit or video block 18 of the present invention. A data bus 24 electrically connects a direct memory access block (DMA) 26, video processor 28, modulated waveform generator 30, and configuration registers 32. The configuration registers 32 are bidirectionally connected to the Frequency Synthesizer 34, DMA 26, video processor 28, and the modulated waveform generator 30. The frequency synthesizer 34 bidirectionally connects to the modulated waveform generator 30. In the system 10 disclosed in FIG. 1, the modulated waveform generator 30 improves apparent resolution, creates grayscale, and varies contrast/density.

In the present invention, a modulated waveform generator 30 provides patterns and a pulse-width modulation like function using an oversampling clock input with a programmable oversample ratio, a programmable decoding table, and comparators. The modulated waveform generator generates an arbitrary pattern (for each pixel code) when the decoding table is loaded with the patterns. The pattern width is limited to the smaller of the table width or the oversample ratio. The number of sample clocks per output pixel is referred to as the number of taps. At higher oversampling rates there are more taps per pixel and the pulse comparators can be used to generate two independent pulses placed anywhere within the pixel window. The number of taps is limited by the width of the counters, comparators, and the ASIC process frequency.

Figure 3A:
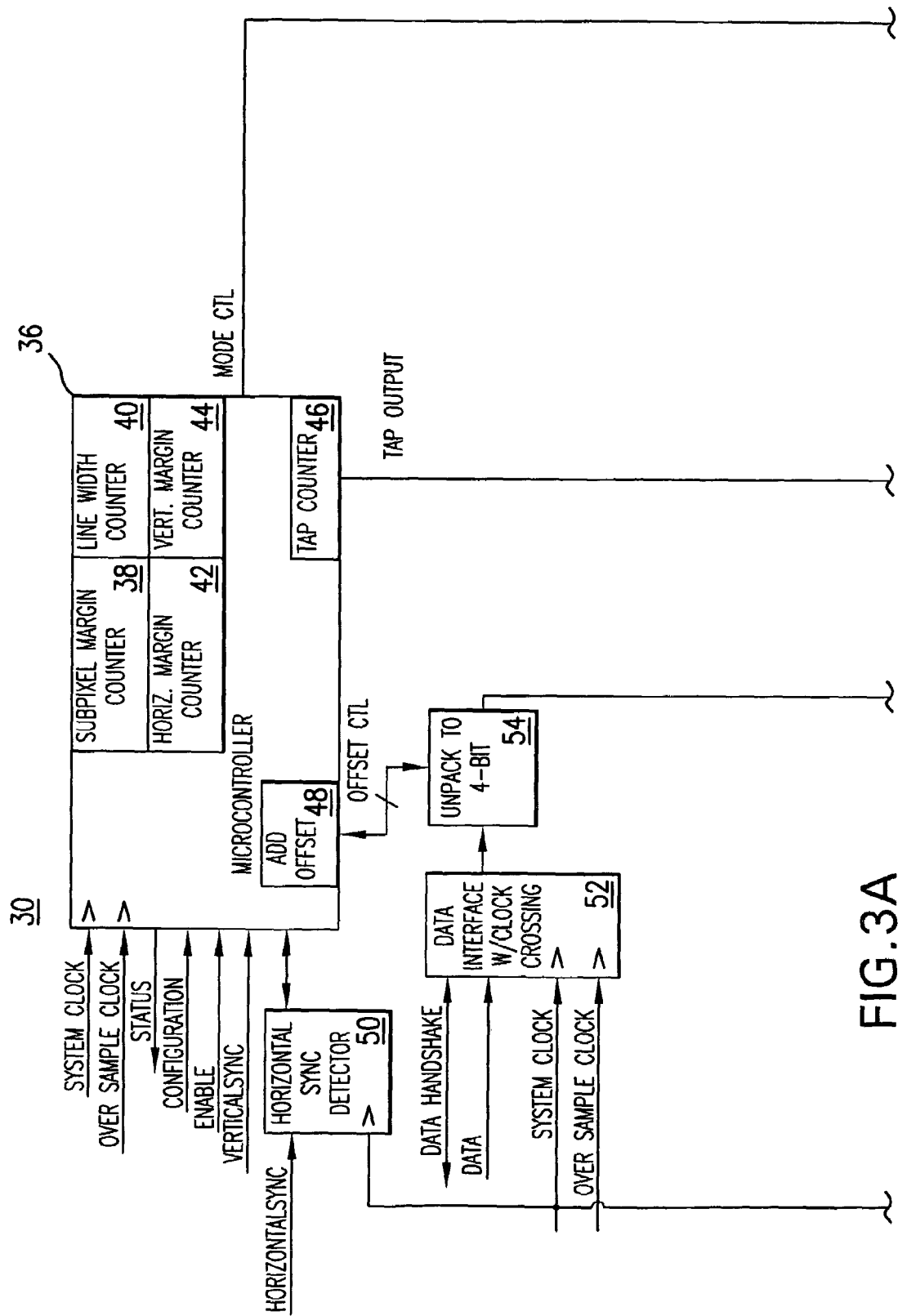
FIGS. 3A and 3B disclose the modulated waveform generator shown in FIG. 2.
Figure 3B:
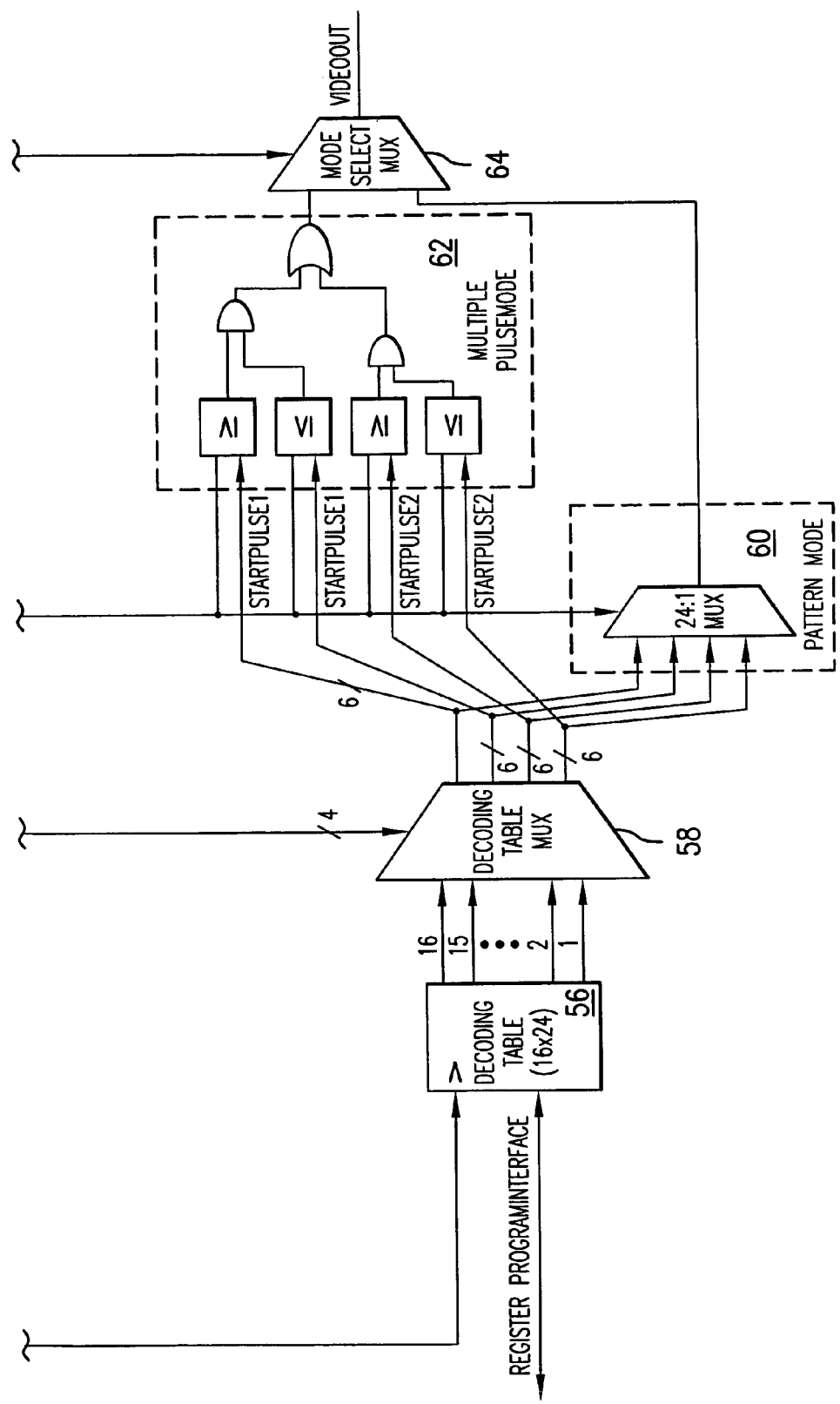

FIGS. 3A and 3B is a functional block diagram corresponding to the modulated waveform generator 30 shown in FIG. 2. While both pattern and multiple pulse mode generation capabilities are described, the modulated waveform generator can include either pattern or multiple pulse mode. When only one mode has been implemented, the mode select circuitry is unnecessary.

A MicroController 36 receives the following input signals: Configuration, Enable, VerticalSync, HorizontalSync, OversampleClock and SystemClock. The OversampleClock signal is received from the frequency synthesizer 34 shown in FIG. 2. Within the MicroController 36, there are several counters: SubpixelMargin 38, LineWidth 40, HorizMargin 42, VertMargin 44, and TapCounter 46. Additionally, there is an AddOffset block 48. Output signals generated include: OffsetCtl, ModeCtl, and TapOutput.

The HorizontalSyncDetect signal indicates that the printer 10 is positioned at the beginning of a row. In some laser printers, this signal is referred to as the "beam detect" signal.

The VerticalSync signal indicates that the printer 10 is positioned at the top of the page.

The VertMargin Counter 44 provides vertical margin control to indicate the number of rows that the printer should "wait" before printing.

Horizontal margin control within a row is provided by the HorizMargin 42 and the SubpixelMargin 38 Counters. Combined, these two counters can place the start of printing to a fraction of a pixel. The HorizMargin counter 42 indicates how far from the left or the beginning of a row before printing occurs in whole pixel increments. The Subpixel Margin counter 38 indicates how far from the left margin before printing occurs in a fractions of a pixel, e.g. taps.

The LineWidth counter 40 indicates the default line width of a row. This is used when no "end of line" is indicated by the data.

In operation, the SystemClock signal is used for connections with the configuration registers 32 and the Video Processor 28. The OversampleClock signal is received by the SubpixelMargin Counter 38, HorizMargin Counter 42, Tap Counter 46, and Add Offset block 48 and allows all of the video signal generation to be functioning at a higher frequency than the rest of the system. By only running the minimum amount of circuitry at the higher OverSampleClock rate, both power and gate size of the design can be minimized.

A Horizontal Synchronization Detector 50 receives the OverSampleClock signal and the HorizontalSyncDetect signal to generate the HorizontalSyncDetect signal. A Data Interface block 52 that includes clock crossing receives the following signals: SystemClock, and OversampleClock. It further receives Data and transceives a DataHandshake signal with the Video Processor 28. In operation, the block receives data from the Video Processor 28 that is in the SystemClock domain and must handle this data in logic that is in the OverSampleClock domain, so a clock crossing function is needed.

An Unpacker block (Unpack to 4-bit) 54 receives the output of the Data Interface block 52 and the OffsetCtl signal. The incoming Data signal is unpacked to a 4-bit encoded value. The incoming data is 32 bits of packed data that represents 1, 2 or 4-bits per pixel (bpp). Since both 1 bpp and 2 bpp data do not completely specify a 4-bit value the Add Offset Block 48 provides a means to use different portions of the Decoding Table 56 for 1 and 2 bpp data. For these modes, the Add Offset amount is added to the incoming pixel value to generate a 4-bit value.

For example, if the block is receiving 1-bpp data and the Add Offset block 48 is configured with the value 8, then entry 8 will be used for a data value of '0' and entry 9 will be used for a data value of '1'.

A Decoding Table 56 receives the SystemClk and transceives a RegisterProgramInterface Signal from the Config Registers 32. In this embodiment, the Decoding Table 56 may be implemented as a set of 16 registers that each contain 24 bits of information. Thus, there are 16 output signals that are 24 bits wide. To illustrate, if each pixel is represented by 4-bits, there are a maximum of 16 choices for pixel activation. Each pixel value can be used to select a single register's 24 bit value. While in this embodiment, the output is described as all bits in parallel, activation could also be described sequentially, e.g. as with a RAM, or a look-up table (LUT). If the Decoding Table 56 is in the form of a RAM, the RAM would either be located in the high frequency OverSampleClock domain, or would need a clock crossing block to move the data over to this high frequency domain. Although the Decoding Table 56 operates in the processor clock domain, it is unnecessary to update the table on the fly. Since the output data is stationery during the print process, the system does not have any clock crossing issues.

A Decoding Table multiplexer (MUX) 58 receives the 16 output signals from the Decoding Table 56 and the unpacked 4-bit encoded value from the Unpacker block 54. The output of the Decoding Table MUX 58 is a 24-bit value that is used in one of two modes: pattern and pulse. The Decoding Table MUX 58 indexes into the Decoding Table 56 to select the table entry to be used for the unpacked pixel.

A Pattern Mode MUX 60 receives the 24-bit value from the Decoding Table MUX 58 as inputs. The TapOutput signal is received as a selector signal. In pattern mode, the 24-bit value (or a portion thereof) is serially shifted to the video output at the oversample rate. Any arbitrary waveform may be generated but is limited to the lesser of 24 bits or the oversample rate. In this embodiment, the maximum serial output is 24 bits but may correspond to the width of the Decoding Table 56.

A Multiple Pulse Mode block 62 that includes logic circuitry receives the 24-bit value from the Decoding Table MUX 58 as inputs. The inputs are interpreted as pulse control signals: Start Pulse 1, Stop Pulse 1, Start Pulse 2, and Stop Pulse 2. In this embodiment, each of the pulse control signals is 6 bits wide. The TapOutput signal is logically combined with each pulse control signal to determine whether Pulse 1 or Pulse 2 is being controlled. In this embodiment, up to 64 clock cycles may be used to describe a pixel, e.g. the pixel may be positioned in 1/64 fractions of a pixel.

In multiple pulse mode, higher oversampling rates may be applied, but the decoding is limited to one or two pulses within the pixel window. The MicroController 36 coordinates the timing of the datapath and also controls horizontal and vertical synchronization. The MicroController 36 further controls the pixel margin and subpixel margin.

A Mode Select MUX 64 receives as input signals the outputs of the Pattern Mode 60 and Multiple Pulse Mode 52 blocks. It further receives a ModeCtl signal from the MicroController 36 to determine which input signals should be transmitted as the VideoOut Signal.

Although the present invention has been described in the context of a single beam printer where each beam moves from left to right, one skilled in the art can extrapolate from the description how to generate a dual beam printer having beams moving in opposing directions. To illustrate, for such a dual beam printer, each beam would be controlled by a separate video controller. The decoding table would be shared between the two video controllers. The first beam would move from left to right while the second beam would move from right to left. The tap counter associated with the second beam would count down while the tap counter associated with the first beam would count up. This would account for the different scanning directions.

For multi-beam laser printing systems, a separate video block can be included for each beam. Since every video block could use the same decoding table values, a single common decoding table could be used for all video blocks. This sharing of the decoding table could be used to reduce the overall size of the video circuitry.

We claim:

1. A printer comprising:
   a laser driver;
   a print control engine; and
   a video controller, connected to the print control engine and
       a laser driver, having a video block including,
       a direct memory access (DMA) block,
       a video processor,
       a waveform generator including a pattern mode block and a multiple pulse mode block,
       a frequency synthesizer connected to the waveform generator,
       configuration registers connected to the DMA block, video processor, waveform generator and the frequency synthesizer, and
       a data bus, operative to carry bus control signals, connecting the DMA block, video processor, waveform generator, and the configuration registers;
   wherein the waveform generator includes:
       a controller, configured to generate a mode control signal and a tap output signal;
       a decoding table configured to generate decoding table output signals;
       a decoding table multiplexer, configured to receive the decoding table output signals and to generate pulse control signals; and
       the pattern mode block, configured to receive the pulse control and the tap output signals, and to generate pattern mode signals.

2. A printer comprising:
   a laser driver;
   a print control engine; and
   a video controller, connected to the print control engine and
       a laser driver, having a video block including,
       a direct memory access (DMA) block,
       a video processor,
       a waveform generator including one of a pattern mode and a multiple pulse mode,
       a frequency synthesizer connected to the waveform generator,
       configuration registers connected to the DMA block, video processor, waveform generator and the frequency synthesizer, and
       a data bus, operative to carry bus control signals, connecting the DMA block, video processor, waveform generator, and the configuration registers;
   wherein the waveform generator includes:
       the other of a pattern mode and a multiple pulse mode;
       a controller configured to generate a mode control signal, including a tap counter having a tap output signal;
       a horizontal synchronization detector;
       a data interface block connected to the video processor;
       an unpacker, connected to the controller and the data interface block, and configured to generate unpacker outputs;
       a decoding table having outputs;
       a decoding table multiplexer, configured to receive the outputs from the decoding table and the unpacker outputs, and to generate pulse control signals;
       the pattern mode, configured to receive the pulse control and the tap output signals, and to generate pattern mode signals;
       the multiple pulse mode, configured to receive the pulse control and the tap output signals, and to generate pulse mode signals; and
       a mode selector, configured to receive the pulse mode, pattern mode, and mode control signals, and to generate an output indicative of the state of the mode control signal; and
   wherein the decoding table, data interface block, horizontal synchronization detector and controller are configured to receive a system clock signal.

3. A printer, as defined in claim 2, wherein the pulse control signals are Start Pulse 1, Stop Pulse 1, Start Pulse 2, and Stop Pulse 2.

4. A printer, as defined in claim 3, wherein each of the pulse control signals are 6 bits wide.

5. A printer, as defined in claim 2, wherein the tap counter is configured to increment and decrement.

6. A printer comprising:
   a laser driver;
   a print control engine; and
   a video controller, connected to the print control engine and
       a laser driver, having a video block including,
       a direct memory access (DMA) block,
       a video processor,
       a waveform generator including one of a pattern mode and a multiple pulse mode,
       a frequency synthesizer connected to the waveform generator,
       configuration registers connected to the DMA block, video processor, waveform generator and the frequency synthesizer, and
       a data bus, operative to carry bus control signals, connecting the DMA block, video processor, waveform generator, and the configuration registers;
   wherein the waveform generator includes:
       a controller that includes a tap counter having a tap output signal;
       a horizontal synchronization detector;
       a data interface block connected to the video processor;
       an unpacker, connected to the controller and the data interface block, and configured to generate unpacker outputs;
       a decoding table having outputs;
       a decoding table multiplexer, configured to receive the outputs from the decoding table and the unpacker outputs, and to generate pulse control signals; and
       the pattern mode, configured to receive the pulse control and the tap output signals, and to generate pattern mode signals; and
   wherein the decoding table, data interface block, horizontal synchronization detector, and controller are configured to receive a system clock signal.

7. A printer, as defined in claim 6, wherein the tap counter is configured to increment and decrement.

8. A printer comprising:
   a laser driver;
   a print control engine; and
   a video controller, connected to the print control engine and
       a laser driver, having a video block including,
       a direct memory access (DMA) block,
       a video processor, a waveform generator including one of a pattern mode
and a multiple pulse mode,
a frequency synthesizer connected to the waveform generator,
configuration registers connected to the DMA block, video processor, waveform generator and the frequency synthesizer, and
a data bus, operative to carry bus control signals, connecting the DMA block, video processor, waveform generator, and the configuration registers;
wherein the waveform generator includes:
a controller configured to generate a mode control signal, including a tap counter having a tap output signal;
a horizontal synchronization detector;
a data interface block connected to the video processor;
an unpacker, connected to the controller and the data interface block, and configured to generate unpacker outputs;
a decoding table having outputs;
a decoding table multiplexer, configured to receive the outputs from the decoding table and the unpacker outputs, and to generate pulse control signals; and
multiple pulse mode, configured to receive the pulse control and the tap output signals, and to generate pulse mode signals; and
wherein the decoding table, data interface block, horizontal synchronization detector, and controller are configured to receive a system clock signal.

9. A printer, as defined in claim 8, wherein the pulse control signals are Start Pulse 1, Stop Pulse 1, Start Pulse 2, and Stop Pulse 2.

10. A printer, as defined in claim 9, wherein each of the pulse control signals are 6 bits wide.

11. A printer, as defined in claim 8, wherein the tap counter is configured to increment and decrement.

12. A video controller, comprising:
a direct memory access (DMA) block;
a video processor;
a waveform generator including a pattern mode block and a multiple pulse mode block;
a frequency synthesizer connected to the waveform generator;
configuration registers connected to the DMA block, video processor, waveform generator, and the frequency synthesizer; and
a data bus, operative to carry bus control signals, connecting the DMA block, video processor, waveform generator, and the configuration registers;
wherein the waveform generator includes:
a controller configured to generate a mode control signal and a tap output signal;
a decoding table multiplexer configured to generate pulse control signals;
the pattern mode block, configured to receive the pulse control signals and the tap output signal, and to generate pattern mode signals;
the pulse mode block, configured to receive the pulse control and the tap output signals, and to generate pulse mode signals; and
a mode selector, configured to receive the pulse mode signals, pattern mode signals, and the mode control signal, and to generate an output indicative of the state of the mode control signal.

13. A video controller comprising:
a direct memory access (DMA) block;
a video processor;
a waveform generator including one of pattern mode and a multiple pulse mode;
a frequency synthesizer connected to the waveform generator;
configuration registers connected to the DMA block, video processor, waveform generator, and the frequency synthesizer; and
a data bus, operative to carry bus control signals, connecting the DMA block, video processor, waveform generator, and the configuration registers;
wherein the waveform generator includes:
the other of a pattern mode and a multiple pulse mode;
a controller configured to generate a mode control signal, having a tap counter providing a tap output signal;
a horizontal synchronization detector;
a data interface block connected to the frequency synthesizer;
an unpacker, connected to the controller and the data interface block, and configured to generate unpacker outputs;
a decoding table having outputs;
a decoding table multiplexer, configured to receive the outputs from the decoding table and the unpacker outputs, and to generate pulse control signals;
the pattern mode, configured to receive the pulse control signals and the tap output signal, and to generate pattern mode signals;
the pulse mode, configured to receive the pulse control and the tap output signals, and to generate pulse mode signals; and
mode selector, configured to receive the pulse mode, pattern mode, and mode control signals, and to generate an output indicative of the state of the mode control signal; and
wherein the decoding table, data interface block, horizontal synchronization detector, and controller are configured to receive a system clock signal.

14. A video controller, as defined in claim 13, wherein the pulse control signals are Start Pulse 1, Stop Pulse 1, Start Pulse 2, and Stop Pulse 2.

15. A video controller, as defined in claim 14, wherein each of the pulse control signals are 6 bits wide.

16. A video controller, as defined in claim 13, wherein the tap counter is configured to increment and decrement.

17. A video controller comprising:
a direct memory access (DMA) block;
a video processor;
a waveform generator including one of pattern mode and a multiple pulse mode;
a frequency synthesizer connected to the waveform generator;
configuration registers connected to the DMA block, video processor, waveform generator, and the frequency synthesizer; and
a data bus, operative to carry bus control signals, connecting the DMA block, video processor, waveform generator, and the configuration registers;
wherein the waveform generator includes:
a controller that includes a tap counter having a tap output signal;
a horizontal synchronization detector;
a data interface block connected to the video processor;
an unpacker, connected to the controller and the data interface block, and configured to generate unpacker outputs;
a decoding table having outputs;

a decoding table multiplexer, configured to receive the outputs from the decoding table and the unpacker outputs, and to generate pulse control signals; and the pattern mode, configured to receive the pulse control and the tap output signals, and to generate pattern mode signals; and wherein the decoding table, data interface block, horizontal synchronization detector, and controller are configured to receive a system clock signal.

18. A video controller, as defined in claim 17, wherein the tap counter is configured to increment and decrement.

19. A video controller comprising:
a direct memory access (DMA) block;
a video processor;
a waveform generator including one of pattern mode and a multiple pulse mode;
a frequency synthesizer connected to the waveform generator;
configuration registers connected to the DMA block, video processor, waveform generator, and the frequency synthesizer; and
a data bus, operative to carry bus control signals, connecting the DMA block, video processor, waveform generator, and the configuration registers;
wherein the waveform generator includes:
  a controller configured to generate a mode control signal, including a tap counter having a tap output signal;
  a horizontal synchronization detector;
  a data interface block connected to the video processor;
  an unpacker, connected to the controller and the data interface block, and configured to generate unpacker outputs;
  a decoding table having outputs;
  a decoding table multiplexer, configured to receive the outputs from the decoding table and the unpacker outputs, and to generate pulse control signals; and
  multiple pulse mode, configured to receive the pulse control and the tap output signals, and to generate pulse mode signals; and wherein the decoding table, data interface block, horizontal synchronization detector and controller are configured to receive a system clock signal.

20. A video controller, as defined in claim 19, wherein the pulse control signals are Start Pulse 1, Stop Pulse 1, Start Pulse 2, and Stop Pulse 2.

21. A video controller, as defined in claim 20, wherein each of the pulse control signals are 6 bits wide.

22. A video controller, as defined in claim 19, wherein the tap counter is configured to increment and decrement.

23. The printer, as defined in claim 1, wherein the waveform generator further includes:
the multiple pulse mode block, configured to receive the pulse control and the tap output signals, and to generate pulse mode signals; and
a mode selector, configured to receive the pulse mode, pattern mode, and mode control signals, and to generate an output indicative of the state of the mode control signal.

* * * * *